Dec. 15, 1925.

L. E. GODFRIAUX

POWER OPERATED CHUCK

Filed March 16, 1925

Inventor:
Louis E. Godfriaux,
By Samuel N. Pond
Atty.

Dec. 15, 1925.

L. E. GODFRIAUX 1,565,733

POWER OPERATED CHUCK

Filed March 16, 1925     3 Sheets-Sheet 3

Inventor:
Louis E. Godfriaux,
By Samuel N. Pond, Atty.

Patented Dec. 15, 1925.

1,565,733

UNITED STATES PATENT OFFICE.

LOUIS E. GODFRIAUX, OF MADISON, WISCONSIN, ASSIGNOR TO GESHOLT MACHINE COMPANY, OF MADISON, WISCONSIN, A CORPORATION OF WISCONSIN.

POWER-OPERATED CHUCK.

Application filed March 16, 1925. Serial No. 15,706.

*To all whom it may concern:*

Be it known that I, LOUIS E. GODFRIAUX, a citizen of the United States, residing at Madison, in the county of Dane and State of Wisconsin, have invented certain new and useful Improvements in Power-Operated Chucks, of which the following is a specification.

This invention relates to improvements in power-operated chucks for lathes, boring machines, and the like; and has reference more particularly to a known type of chuck wherein the chuck jaws are actuated, when chucking and unchucking the work, by a rotary cam mounted on and coaxial with the spindle, and normally driven in the same direction and at the same speed as the chuck through planetary gearing between the spindle and the cam, but accelerated or retarded in its speed of rotation, so as to actuate the chuck jaws, through a relative turning movement of one of the two ring gears of the planetary system. In early devices of this type such, for example, as that disclosed in Letters Patent to Wendell A. Barker No. 1,249,300, dated December 11, 1917, this movement of the ring gear is effected by hand. In later devices of this general type, such as that disclosed in Letters Patent to Howard M. Hay No. 1,441,803, dated January 9, 1923, the movable ring gear is power-operated. In the devices of both of the aforesaid patents one of the two ring gears is stationary, and the other ring gear is turned in one direction or the other to thereby rotate the cam relatively to the spindle and thus chuck or unchuck the work.

My present invention is a chuck of the power-operated type: but instead of employing a pair of ring gears one of which is stationary and the other of which turns during the chucking and unchucking operations, it employs a pair of ring gears both of which turn, but under differential movements, during the chucking and unchucking operations; and one object of my present invention is to provide a practical and efficient chucking and unchucking mechanism operating on the principle of differentially movable ring gears.

In chucks of this type, when the work is chucked a considerable back stress is transmitted throughout the planetary gear train; and when the chucking force ceases, this static stress continues to exist throughout these parts, and as the spindle rotates the planet pinions are compelled to rotate at considerable speed under this stress, causing severe wear on the teeth of the pinions and gears and making them short-lived. Another important object of the present invention has been to provide a chucking and unchucking mechanism retaining the general features of this type of power-actuated chuck but removing the static stress above referred to and permitting unloaded motion of all gears except when actually chucking or unchucking. This is accomplished through the provision of mechanism which permits a slight automatic reverse or back-slack of the motion of the differential gears after the chucking has been accomplished, so as to ease up the gear train, but without making it necessary to reverse the differential gear driver to accomplish this. Another object of the invention is to provide an improved jaw-actuating cam which will afford a full surface bearing of the jaw trunnion slide block on the cam in all positions of the latter; and which will prevent the stressed jaws of the chuck from moving, even when restraint is removed from the cam by the back-slack in the gears above referred to. Still another object is to provide an improved power drive for the chucking and unchucking mechanism, including a clutch which will automatically engage at a predetermined speed of the chucking motor and will automatically disengage when the speed of the motor falls below that point.

Still other objects and attendant advantages of the invention will be apparent from the following detailed description taken in connection with the accompanying drawings, in which—

Figs. 4, 5 and 6 are fragmentary plan views of the differential gear rings that are cut with oppositely inclined oblique teeth; said views showing intermediate and oppositely offset positions of the herring bone driver gear which occur under different operating conditions; and Fig. 7 is an enlarged cross-section through the shaft of the herring bone drive gear on the line 7—7 of Fig. 1.

Figure 1:
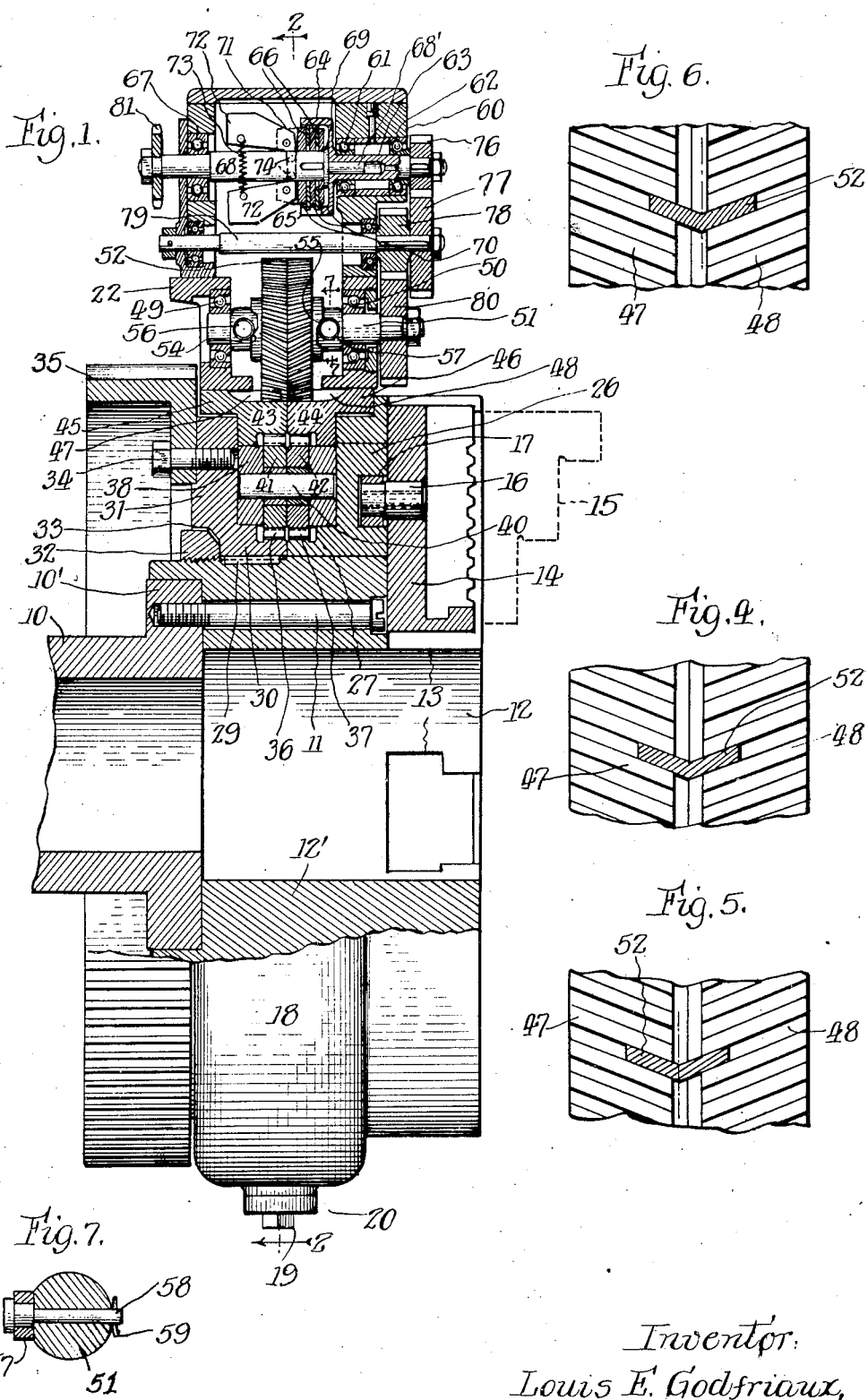
Fig. 1 is a view partly in longitudinal section and partly in side elevation of a chuck equipped with my improved power-operated chucking and unchucking mechanism.

Referring to the drawings, 10 indicates a hollow lathe spindle journaled in suitable bearings (not shown), on the forward flanged end 10' of which is mounted and attached, as by long screws 11, the chuck body 12. This latter is formed in its face with the usual radial undercut slideways 13 to receive the jaw bases 14, these latter in turn carrying the chuck jaws indicated by dotted lines at 15. In the jaw bases 14 are mounted rearwardly projecting studs or trunnions 16 carrying slide blocks 17 which operate in box cams on a cam plate hereinafter described.

Encircling the rear or hub portions 12' of the chuck is a stationary circular casing 18, that is supported upon and secured by a screw 19 to a bracket arm 20 attached to a portion 21 of the lathe bed. The upper side of the casing 18 is cast with a low hollow vertical extension 22 and, at one side of the latter, with a web 23 supporting a horizontal bracket plate 24 that is adapted to form a foundation or rest for an electric motor 25.

Figure 3:
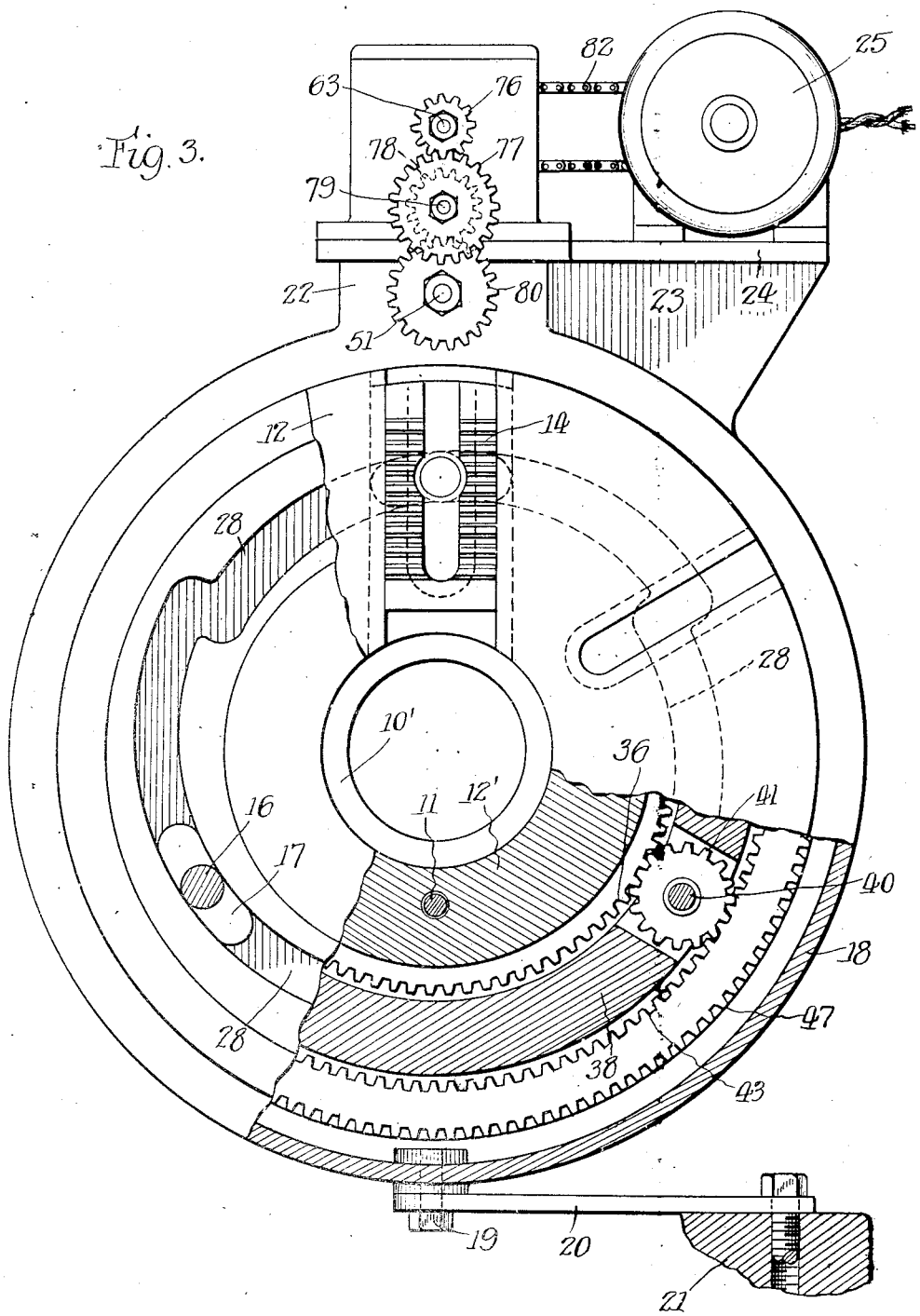
Fig. 3 is a view partly in front elevation and partly in transverse section in different planes, disclosing internal features.

Rotatably mounted on the inner portion of the chuck hub 12' is a circular cam plate or disc 26 formed with a hub 27. In the front face of this cam plate 26 are formed a group (three as herein shown) of eccentrically disposed channel or box cams 28, each approximately 120° in length. It will be observed by reference to Fig. 3 that these cams are not formed as sections of a continuous scroll, as is common in chucks of this type, but each cam is an arc of a true circle, the center of which is eccentric to, or offset from, the center of the cam plate. Where a continuous scroll cam is employed, the slide blocks of the jaw trunnions engaged thereby can have only line contacts with the cam, since the curvature of the cam is continuously changing while the curvature of the block remains constant. The eccentrically disposed arcuate cams herein shown have the advantage that, while functioning as cams, their curvature remains constant, and consequently the slide blocks 7 maintain full surface contact therewith in all positions of the cams.

Figure 2:
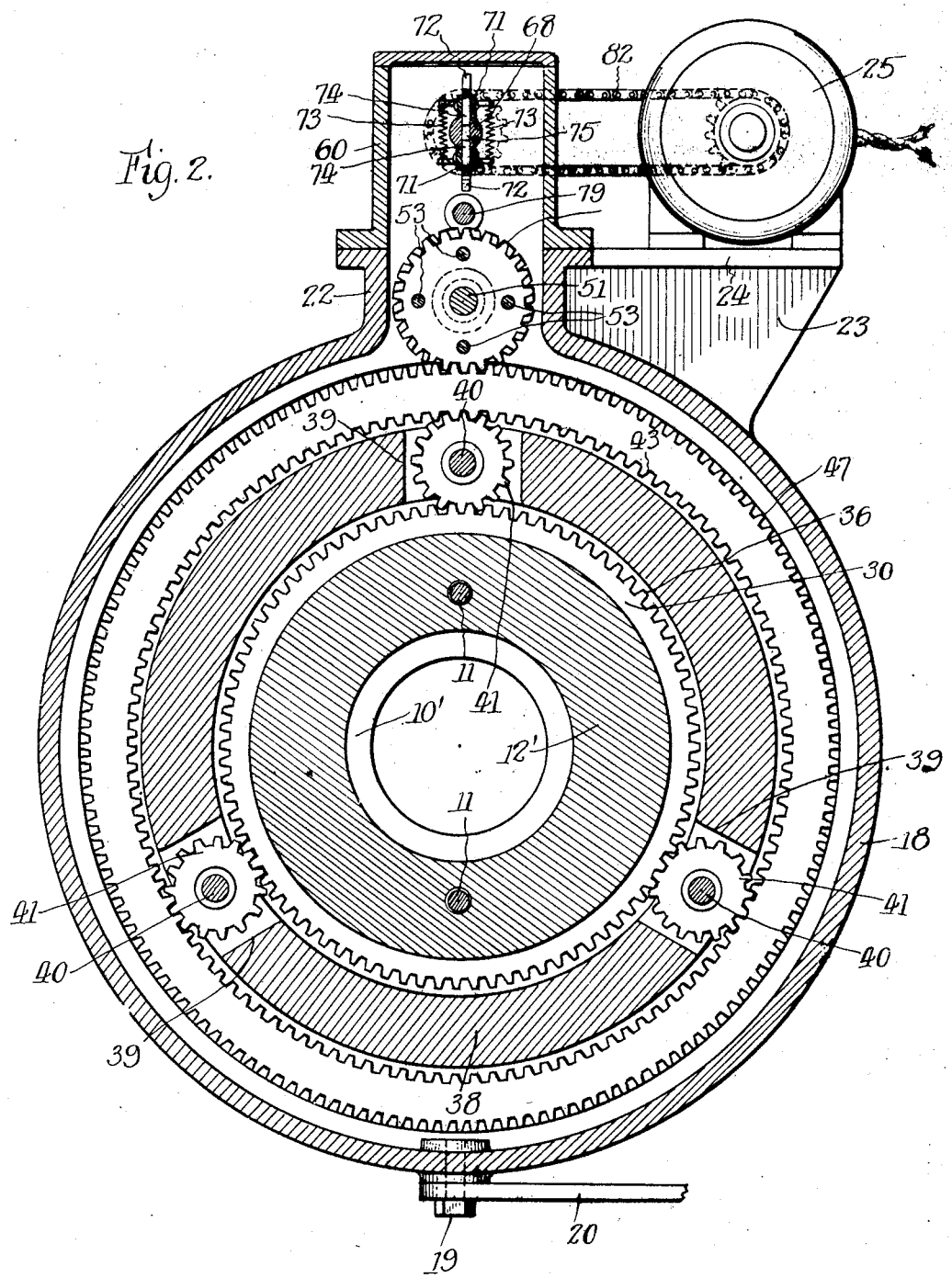
Fig. 2 is a transverse section of the same taken on the line 2—2 of Fig. 1.

Keyed at 29 (Fig. 1) to the hub 12' of the chuck is the hub 30 of a disc 31 of approximately the same diameter as the chuck body 12, said disc being secured on the chuck hub by a nut 32 threaded onto the hub and into a countersink 33 in the face of the disc. To the outer face of the disc 31 is attached by machine screws 34 a spindle driving gear 35, which latter may, manifestly, be mounted directly on the spindle 10 if desired. On the hub 30 of the disc 31 is cut a spur gear 36; and directly opposite the latter on the hub 27 of the cam plate 26 is cut a spur gear 37 of the same diameter and number of teeth. Freely rotatable between the disc 31 and the cam plate 26 is a floating ring 38. This ring, as clearly shown in Fig. 2, is formed with three slots 39 between the inner and outer peripheries thereof located 120° apart. In and between the sides of each of these slots is mounted a pin 40 on which are journaled a pair of planet pinions 41 and 42 of equal size and number of teeth, the pinions 41 meshing with the gear 36 and the pinions 42 meshing with the gear 37. Encircling the floating ring 38 and the series of planet pinions carried thereby are a pair of internal ring gears 43 and 44, the former meshing with the planet pinions 41, and the latter with the planet pinions 42. These internal ring gears 43 and 44 are disposed side by side, as shown in Fig. 1, lying between the disc 31 and the portion of the chuck body that encircles the cam plate 26. The ring 43 is formed with an outwardly directed lateral flange 45, and the ring 44 is formed with a similar outwardly directed flange 46. These flanges have friction bearings on the inner periphery of the stationary circular casing 18 and, in the normal working of the chuck, are maintained stationary through such frictional contact with the casing. In chucking and unchucking, however, these ring gears 43 and 44 are given a differential rotary movement, as hereinafter explained. On the outer peripheries of the rings 43 and 44 are spur gears 47 and 48, respectively. The teeth of these spur gears, as clearly shown in Figs. 4, 5 and 6, are oppositely oblique, for a purpose hereinafter explained, but one of them contains a slightly greater number of teeth than the other. For example, the gear 47 may contain 141 teeth and the gear 48 143 teeth. Hence, it follows that if said gears are both driven by a common gear or pinion, the gear having the smaller number of teeth will have a slight advance rotation over the other gear.

The power-operated mechanism for rotating the rings 43 and 44 comprises the following.

Journaled in anti-friction bearings 49 and 50 in opposite side walls of the casing extension 22 is a shaft 51, on which is loosely mounted a herring bone gear 52. As herein shown, this gear is made up of a pair of gears having oppositely inclined teeth, rigidly united by rivets or bolts 53 (Fig. 2), although the gear may be made as a one-piece structure if desired. The inclination of the teeth of this gear corresponds to the inclination of the teeth of the gears 47 and 48 driven thereby, as clearly shown in Figs. 4, 5 and 6. On the ends of the hub of the driver gear 52 are formed oppositely directed cams 54 and 55, and co-operating with these cams are rollers 56 and 57, each of which, as shown in the detail view Fig. 7, is journaled on a pin 58 extending through the shaft 51 and secured therein as by means of a cotter pin 59.

Mounted on the casing neck 22 is a housing designated as an entirety by 60, in which is mounted part of the transmission line (including an automatic clutch) from the motor 25 to the drive pinion shaft 51. In one vertical wall of the housing 60 is journaled in anti-friction bearings 61 and 62 a hollow shaft 63, on the inner end of which is formed a clutch drum 64, within which are splined, as indicated at 65, a plurality of friction discs 66. Journaled in an anti-friction bearing 67 in the opposite wall of the housing is a shaft 68 formed at its inner end with a reduced extension 68' that has a bearing within the hollow shaft 63. At the junction of the shaft 68 and its reduced extension 68' is a radial flange 69. Splined on the shaft 68 behind the flange 69 and alternating with the friction discs 66 of the drum are a series of friction discs 70, the outermost of which is formed with laterally projecting forked lugs 71 (see Fig. 2), in which are pivoted an oppositely disposed pair of centrifugal governor weights 72 connected by tensile springs 73. On the inner ends of the weights 72 are short fingers 74 that enter and fulcrum in a transverse slot 75 in the shaft 68. Between the outer end of the shaft 63 and the corresponding end of the drive shaft 51 is a speed reducing train, comprising a pinion 76 on shaft 63, a gear 77 and pinion 78 on an intermediate shaft 79, and a gear 80 on shaft 51. On the outer end of shaft 68 is a sprocket wheel 81 driven by a sprocket chain 82 from the shaft of the motor 25; it being understood that said motor is equipped with direction reversing momentary contact switches (not shown).

Briefly describing the operation, in the normal rotation of the chuck the ring gears 43 and 44 are stationary owing to their frictional engagement with the internal periphery of the stationary casing, and the gear 36 which rotates with the chuck, through the planet pinions 41 and 42 and the gear 37, imparts a rotary movement to the cam plate 26 in the same direction and at the same speed as the chuck itself, whereby the cams 28 are stationary relatively to the slide blocks and trunnions of the jaws, and the latter remain fixed with reference to the work held therein. When a piece of work is to be chucked or unchucked, the shaft 68 is driven at a high speed from the motor, and this, through co-operative action of the centrifugal governor arms 72 and the shaft flange 69, causes the friction discs 66 to be gripped by the friction discs 70, thereby driving the shaft 63 and, through the speed reducing gear train, driving the shaft 51 at a slower speed. As the shaft 51 starts to rotate, one of the cam rollers 56 or 57 acting on its cam 54 or 55, shifts the herring bone gear 52 laterally from the position shown in Fig. 4 to that shown in Fig. 5 or Fig. 6, depending upon the direction of rotation of the shaft 51. This sets up a slight initial turning movement of the differential gears 47 and 48 in opposite directions, the lateral shifting of the driver gear being, of course, limited by the other or idle cam roller abutting against the driver hub at the bottom of its cam. Rotation of the driver gear immediately follows, which causes simultaneous rotation of the gear rings 43 and 44 both in the same direction; but since the gears 47 and 48 carried thereby have a different number of teeth, a differential rotation of the gear rings 43 and 44 takes place which, through the planet pinions 41 and 42, causes the cam plate 26 to rotate in one direction or the other relatively to the chuck body, so that the cams 28 are caused to act upon the slide blocks and trunnions of the chuck jaws, moving the latter outwardly or inwardly, as the case may be. It will be readily understood that when the driver 52 is driven in one direction, a relative rotation of the cam plate to the chuck will take place in one direction, and when the driver gear is driven in the reverse direction, a relative rotation of the cam plate to the chuck will take place in the opposite direction. As previously stated, the chucking of the work (which may be either external or internal involving opposite movements respectively of the cam) transmits a considerable stress throughout the train from the jaws to the driving pinions. Now, when the chucking has been effected and the drive of the gear 52 arrested, the static stresses in the gear train reacting in opposite directions on the differential gears 47 and 48 both shift the driver gear 52 axially on its shaft back to the central position shown in Fig. 4 without necessarily causing any rotation of the driver gear, and in doing this the differential gears 47 and 48 undergo a sufficient back-lash to eliminate the static stresses. The cams on the hubs of the driver gear during such return movement of the latter to central position cause a slight rotation of the idle transmission gears and clutch drum, permitting such axial movement to continue until the force ceases, and this occurs when the axial movement of the gear has, owing to its herring bone tooth form, permitted relative movement of the differential gears. This force is, of course, due only to the strain in the gears, pinions and studs within the chuck caused by the chucking stress, and disappears when the parts are free to slip to their unstrained positions.

It will be observed that the pitch of the cams in the jaw-actuating cam plate is small enough to prevent the stressed jaws from moving when the restraint is removed from the cam plate through the above described back-lash of the gearing. It is also noteworthy that the spiral differential gears driven by a laterally movable herring bone driving gear avoid the necessity of providing a mechanism for slightly reversing these gears in order to slacken up the gear train and remove the static stress; this result being obtained automatically in the described construction.

The provision of the automatically engaging and disengaging friction disc clutch in the transmission line from the motor to the driving gear of the planetary system constitutes a safety feature, since the clutch will slip if the motor is not stopped at the instant the proper chucking pressure is reached, and, being automatic, it dispenses with the necessity of a manually operated clutch-shifting device. This last described feature may, manifestly, be employed to advantage in power-operated chucking and unchucking mechanisms other than the particular mechanism herein described and shown.

With the parts proportioned substantially as shown, and a comparatively high speed of rotation of the drive shaft 51, the power is applied at a very advantageous leverage to the work, such as easily overcomes the friction by which the differential gear rings 43 and 44 are held stationary in the casing during the operation of the chuck when at work. The entire mechanism is compactly arranged and mounted on and in the chuck itself in advance of the forward bearing of the spindle on the lathe head.

While I have herein shown and described one practical and approved mechanical embodiment of the principle of the invention, it is manifest that the structural details may be considerably modified without involving any departure from the principle of the invention or sacrificing any of the advantages thereof. Hence, I reserve all such variations and modifications as fall within the spirit and purview of the appended claims.

I claim—

1. In a chuck, the combination of a spindle, a chuck body mounted on said spindle, jaws carried by said chuck body, a jaw-actuating cam plate, means, including a planetary gear system, normally rotating said cam plate in the same direction and at the same speed as said chuck body, said gear system including a pair of internally toothed ring gears, means normally holding said ring gears against rotation during rotation of the chuck, and power actuated means for effecting rotation of both said ring gears at differential speeds whereby to rotate said cam plate relatively to the chuck for chucking and unchucking the work.

2. In a chuck, the combination of a spindle, a chuck body mounted on the forward end of said spindle, jaws carried by said chuck body, a jaw-actuating cam plate rotatably mounted in and coaxial with said chuck body, a stationary casing encircling said chuck body, means, including a planetary gear system, normally rotating said cam plate in the same direction and at the same speed as said chuck body, said gear system including a pair of internally toothed ring gears frictionally held by said casing against rotation during working rotation of the chuck, and power-actuated means for effecting rotation of both said ring gears at differential speeds whereby to rotate said cam plate relatively to the chuck for chucking and unchucking the work.

3. In a chuck, the combination of a spindle, a chuck body mounted on the forward end of said spindle, jaws carried by said chuck body, a jaw-actuating cam plate rotatably mounted in and coaxial with said chuck body, a stationary casing encircling said chuck body, means, including a planetary gear system, normally rotating said cam plate in the same direction and at the same speed as said chuck body, said gear system including a pair of internally toothed ring gears frictionally held at their outer peripheries by said casing against rotation during working rotation of the chuck, and power-actuated means mounted in said casing for effecting rotation of both said ring gears in either direction at differential speeds whereby to rotate said cam plate in one direction or the other relatively to the chuck for chucking and unchucking the work.

4. In a chuck, the combination of a spindle, a chuck body mounted on the forward end of said spindle, jaws carried by said chuck body, a jaw-actuating cam plate rotatably mounted in and coaxial with said chuck body, a stationary casing encircling said chuck body, means, including a planetary gear system, normally rotating said cam plate in the same direction and at the same speed as said chuck body, said gear system including a pair of internally toothed ring gears frictionally held by said casing against rotation during working rotation of the chuck, differentially toothed external gears formed on said ring gears respectively, a driving gear journaled in said casing and meshing with both said differentially toothed external gears, and power-operated means for rotating said driving gear.

5. In a chuck, the combination of a spindle, a chuck body mounted on said spindle, jaws carried by said chuck body, a motor, and chucking mechanism between said motor and said jaws including an automatically engaging friction clutch adapted to slip when the required chucking pressure has been reached.

6. In a chuck, the combination of a spindle, a chuck body mounted on the forward end of said spindle, jaws carried by said chuck body, a jaw-actuating cam plate rotatably mounted in and coaxial with said chuck body, a stationary casing encircling said chuck body, a planetary gear system drivingly connecting said chuck body to said cam plate and rotating the latter in the same direction and at the same speed as said chuck body, said gear system including a pair of internally toothed ring gears held against rotation during working rotation of the chuck, differentially toothed external gears formed on said ring gears respectively, a driving gear journaled in said casing and meshing with both said differentially toothed external gears, a motor, and a transmission mechanism, including an automatically engaging clutch, between said motor and said driving gear adapted to yield when the required chucking pressure has been reached.

7. In a chuck of the character described, the combination of a spindle, a chuck body mounted on the forward end of said spindle, jaws carried by said chuck body, a jaw-actuating cam plate rotatably mounted in and coaxial with said chuck body, a stationary casing encircling said chuck body, means, including a planetary gear system, normally rotating said cam plate in the same direction and at the same speed as said chuck body, said gear system including a pair of internally toothed ring gears held against rotation during working rotation of the chuck, differentially toothed external gears having oblique teeth formed on said ring gears respectively, a laterally shiftable herring bone driving gear journaled in said casing and meshing with both said differentially toothed external gears, a motor, and a transmission mechanism from said motor to said driving gear operating to shift the latter sidewise at the inception of its drive and permit said gear to shift sidewise in the reverse direction at the conclusion of its drive under the static stresses in said planetary gear system to thereby permit subsequent operation of said planetary gear system free from said stresses.

8. A specific structural embodiment of the subject-matter of claim 8, wherein said herring bone driving gear is loose on a drive shaft journaled in said casing, and is formed with oppositely inclined cams on the ends of its hub, respectively, which cams are engaged by studs mounted in said drive shaft, said studs and their co-operating cams operating to shift said driving gear in an axial direction at the inception of its drive and permit said gear to shift axially in the reverse direction at the conclusion of its drive under the static stresses in said planetary gear system, thereby permitting subsequent unloaded operation of said planetary gear system.

LOUIS E. GODFRIAUX.